United States Patent [19]

Hsieh

[11] Patent Number: 5,413,836
[45] Date of Patent: May 9, 1995

[54] FRAME BAR EXTRUSION

[76] Inventor: Kin L. Hsieh, No. 9, Alley 17, Lane 26, Jihhsin St., Tu Cheng Hsiang, Taipei Hsien, Taiwan, Prov. of China

[21] Appl. No.: 89,662

[22] Filed: Jul. 9, 1993

[51] Int. Cl.6 .......................... B32B 3/20; E04H 12/00
[52] U.S. Cl. .................................. 428/188; 428/122; 428/167; 428/178; 428/192; 52/648.1; 52/655.1
[58] Field of Search .................. 428/188, 167, 178, 33, 428/192, 99, 121, 122; 52/637, 648.1, 649.6, 653.1, 653.2, 655.1, 726.1; 403/169, 171, 174, 177, 178, 218

[56] References Cited

U.S. PATENT DOCUMENTS 3,659,309 5/1972 Besnard ........................... 15/250.32

*Primary Examiner*—Donald J. Loney
*Attorney, Agent, or Firm*—Ralph F. Crandell; Holland & Hart

[57] ABSTRACT

A frame which is configured by means of a number of extrusions, a number of links, a number of bolts, a number of nuts and a number of nut positioners. Each link defines a number of holes. Each extrusion defines at least one longitudinal channel being cruciform as shown in a cross-sectional view taken on a plane intersecting the extrusion. Each nut positioner defines a recess so that the nuts are kept from rotating in the recess and a profile so that it can be positioned at any desired point in the channels. A number of bolts are inserted through the holes formed in each link and further secured in the nuts retained in the channels formed in a number of extrusions. Each link can be attached to a number of extrusions. Thus, a frame can be configured by means of a number of extrusions.

4 Claims, 3 Drawing Sheets

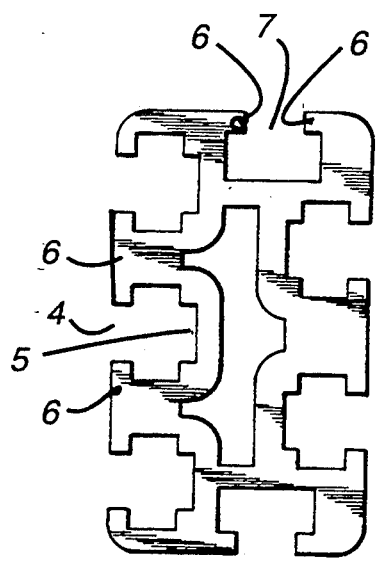
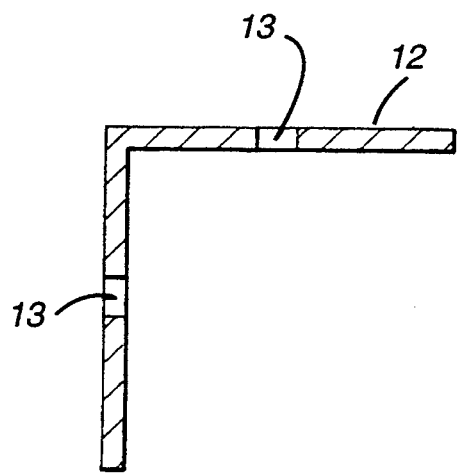
Fig. 3
Fig. 5
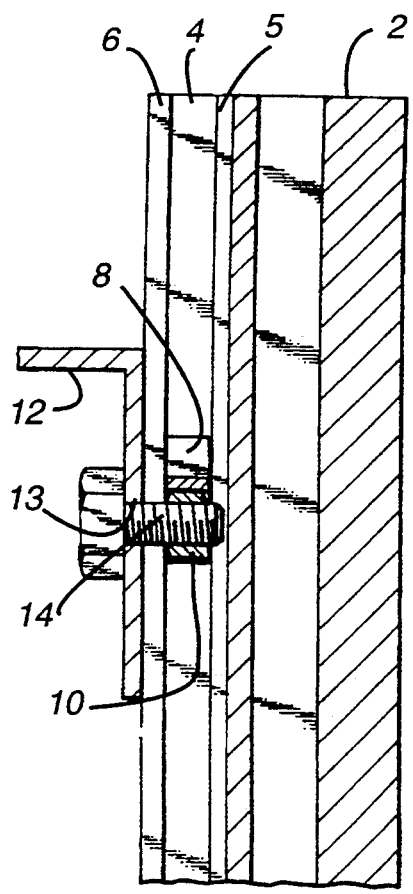
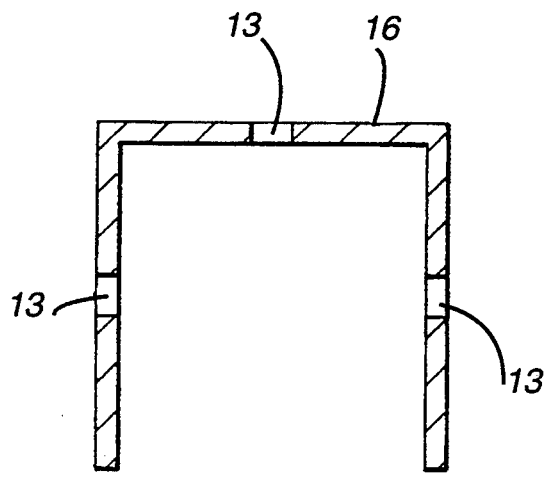
Fig. 4
Fig. 6

FRAME BAR EXTRUSION

BACKGROUND OF INVENTION

1. Field of Invention

This invention relates to an extrusion.

2. Related Prior Art

There have been many extrusions for various purposes. However, there has not been any extrusion which can be used so as to configure a frame, using a minimum number of tools.

SUMMARY OF INVENTION

A frame is configured by means of a number of extrusions, a number of links, a number of bolts, a number of nuts and a number of nut positioners. Each link defines a number of holes. Each extrusion defines at least one longitudinal channel being cruciform as shown in a cross-sectional view taken on a plane intersecting the extrusion. Each nut positioner defines a recess so that the nuts are kept from rotating in the recess and a profile so that it can be positioned at any desired point in the channels. A number of bolts are inserted through the holes formed in each link and further secured in the nuts retained in the channels formed in a number of extrusions. Each link can be attached to a number of extrusions. Thus, a frame can be configured by means of a number of extrusions.

For a better understanding of the present invention and objects thereof, a study of the detailed description of the embodiments described hereinafter should be made in relation to the accompanying drawings.

BRIEF DESCRIPTION OF DRAWINGS

FIG. 3 is a top view of an extrusion vertically retained in accordance with this invention;

FIG. 4 is a cross-sectional view of an extrusion in accordance with this invention, with a link mounted thereon by means of a bolt secured in a nut positioned therein by means of a nut positioner;

FIG. 5 is a cross-sectional view of a link in 14 accordance with a first embodiment of this invention; and FIG. 6 is a cross-sectional view of a link in accordance with a second embodiment of this invention.

DETAILED DESCRIPTION OF PREFERRED EMBODIMENT

Figure 1:
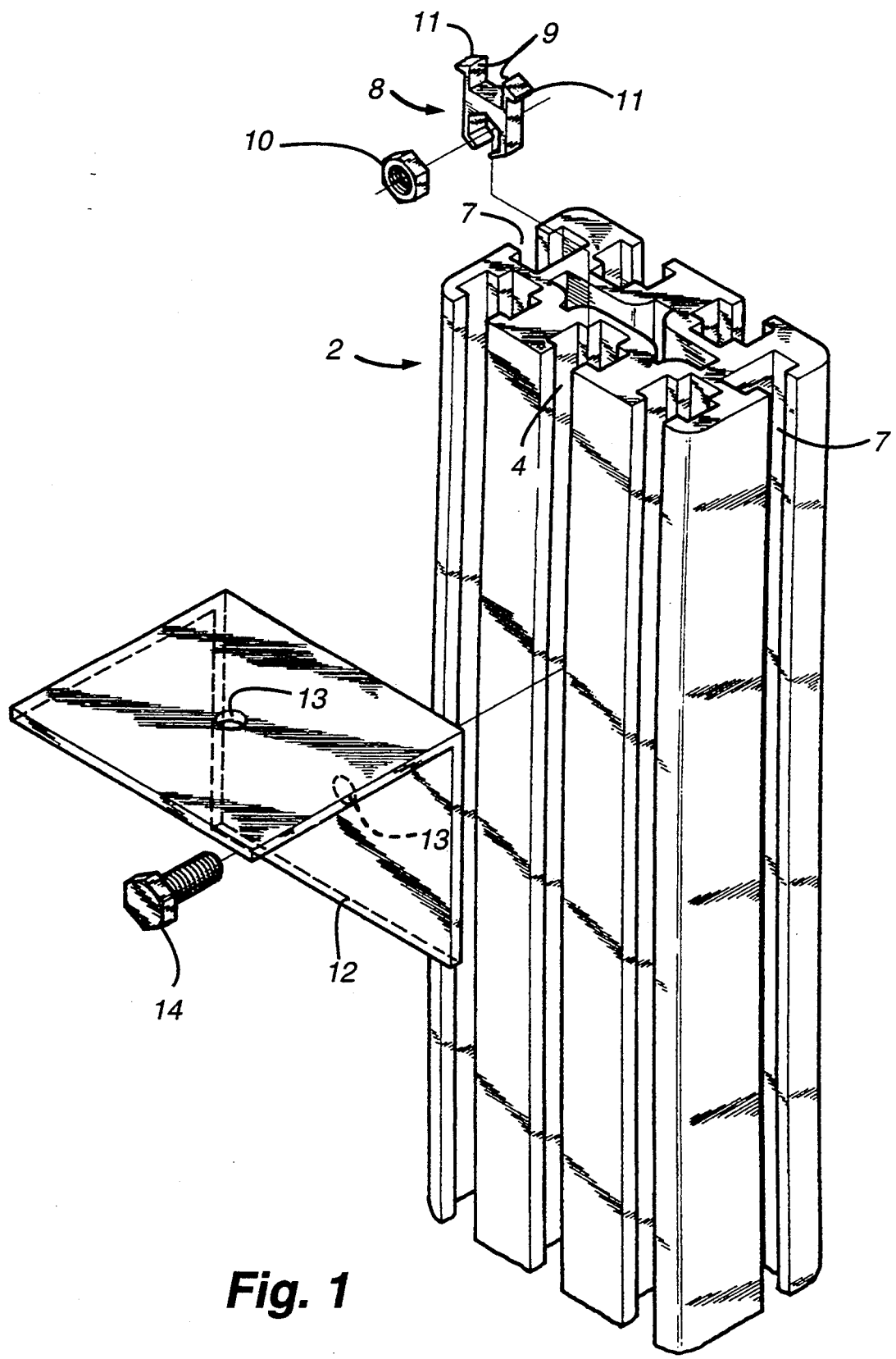
FIG. 1 is a perspective view of an extrusion retained vertically, a link, a nut, a bolt and a nut positioner in accordance with the preferred embodiment of this invention.
Figure 2:
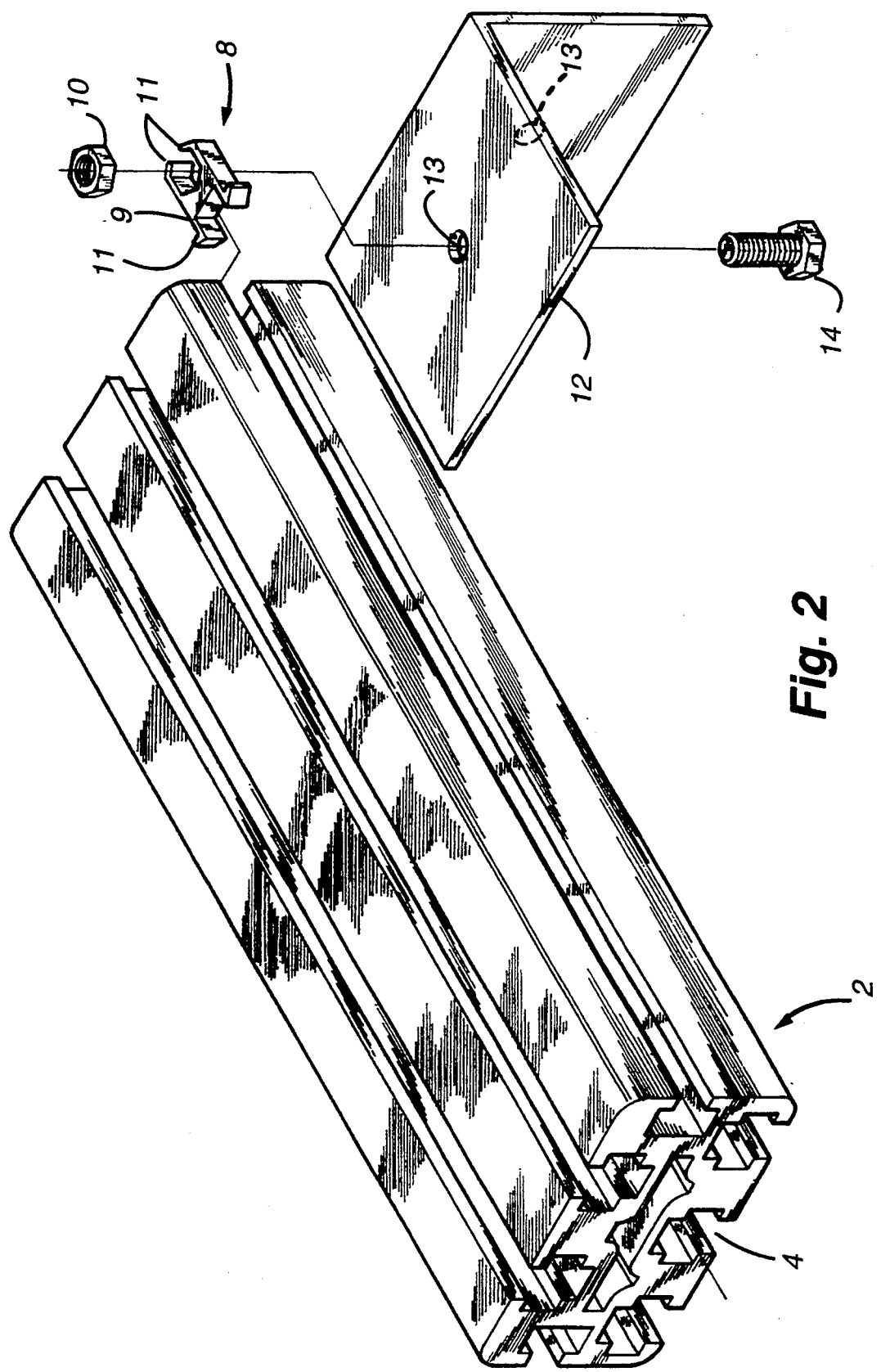
FIG. 2 is a perspective view of an extrusion retained horizontally, a link, a nut, a bolt and a nut positioner in accordance with the preferred embodiment of this invention.

Referring to FIGS. 1 and 2, the present invention is embodied in a new and unique extrusion 2, a plurality of which extrusions 2 can be assembled into a frame (not shown) for various purposes. For securing the extrusions together, links or brackets 12 are secured to the extrusions 2 by a plurality of pairs of threaded nuts 10 and bolts 14, the nuts being engaged in a corresponding number of nut retainers or positioners 8 and the bolts extending through apertures 13 in the brackets or links 12. A wide range and variety of frames can be constructed from the foregoing elements. The present invention will be described more particularly by description of a primary frame unit employing an extrusion 2 in a vertical configuration shown in FIG. 1, coupled to an extrusion 2 in a horizontal position as shown in FIG. 2 by a bracket or link 12.

Referring to FIG. 3, each extrusion 2 longitudinally defines at least one channel for use in the coupling of extrusion units. One form of channel 7 is defined by means of a bottom and two side walls from each of which side walls a flange 6 projects inwardly, that is, two flanges 6 project towards each other. The terms "bottom" and "side" are given in relation to the horizontal extrusion 2 shown in FIG. 2, and the channel 7 is thereby defined as a "T" or T-shaped in a transversely cross-sectional view.

An alternative channel 4 is shaped similarly to the T-shaped channel 7, and is defined by a bottom wall and two side walls from each of which walls a flange 6 projects. However, a slot 5 is defined in the bottom wall of the channel 4. Thus, the channel 4 is a "+" cruciform, or cross-shaped channel in a transversely cross-sectional view.

Each nut retainer or positioner 8, as shown in FIG. 2, defines a recess for receiving a nut 10 so that the former is kept from rotating in respect to the latter. Two legs 9 project from the nut positioner 8, spaced from each other. A foot 11 transversely projects from each leg 9 so that the feet 11 project away from each other. The legs 9 are used to provide elasticity. When the nut positioner 8 is disposed in the channel 4 or 7, the legs 9 bias the feet 11 so as to abut against the side walls of the channel 4 or 7. Thus, when the frame is assembled, the nut positioner 8 grips the walls of the channel 4 or 7 and will be retained in the desired position. However, when the nut and bolt is loose, the nut positioner 8 can be moved by sliding in the channel 4 or 7.

The bracket or link 12, as shown in FIG. 5, is an L-shaped element, having two flat leg portions which are formed together with a right angle between each other. A metal strip can be bent so as to form the link 12. Alternatively, the link 12 can be cast from metal. Each flat or leg flange portion of the link 12 defines an aperture 13 for receiving a threaded bolt 14.

In the assembly of the primary frame unit, as shown in FIG. 4, a threaded nut 10 is inserted in the recess defined in a nut positioner 8. The nut positioner 8 is disposed in a desired position in a slot 4 or 7 defined in an extrusion 2. Obviously, the slot 4 must have an open end so that the nut positioner 8 can be inserted into the slot 4. A first leg or flat portion of the link 12 is disposed against a face of the extrusion and the pair of flanges 6 which define the slot 4. A threaded bolt 14 is inserted through a hole 13 defined in a first flat portion of the link 12, and is engaged with the threaded nut 10. If the tip of the threaded bolt 14 extends beyond the threaded nut 10, it is received in the slot 5. As the nut and bolt are tightened, the pair of flanges 6 and the first flat portion of the link 12 are firmly sandwiched between the threaded nut 10 and a head of the threaded bolt 14, and the extrusion 2 is firmly attached to the first flat portion of the link 12. Similarly, another extrusion 2 can be firmly attached to the second flat portion of the link 12. In the manner, two extrusions 2 are securely assembled to form a the primary frame unit.

It is to be understood that various frames and structures can be assembled from a plurality of extrusions and links. For example, a flat link or plate (not shown) which defines a plurality of apertures (not shown) can be used to connect a plurality of extrusions in parallel relation to one another. Referring to FIG. 6, there is shown a U-shaped link 16 defining three flat portions which are formed together with right angles between them. A metal strip can be bent so as to form the link 16 or the link 16 can be cast from metal. Each flat or planar portion of the link 16 defines an aperture 13 for receiving a threaded bolt 14.

Referring to FIG. 6, a link 16 in accordance with a second embodiment of this invention has three flat portions formed together with one another at an angle of 90°. Each flat portion of the link 16 defines a hole. The link 16 links three extrusions 2 to one another. Obviously, various links join various extrusions 2 to one another. Thus, various frame can be configured by means of a plurality of extrusions 2.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A frame comprising:
   a plurality of extrusions each longitudinally defining at least one channel having a bottom and two side walls, a flange projecting from each side wall toward the other side wall;
   a plurality of links each defining a plurality of apertures;
   a plurality of threaded nuts; and
   a plurality of threaded bolts
   wherein each of the links is disposed against the flanges of one of the extrusions, and each of the threaded nuts is receivable in the channel defined in one of the extrusions, and each of the threaded bolts is insertable through one of the apertures defined in one of the links into the slot defined in one of the extrusions, and each of the threaded bolts is engagable with one of the threaded nuts for firmly abutting each of the links against the flanges of one of the extrusions.

2. A frame as defined in claim 1, further comprising a plurality of nut positioners each defining a recess for receiving one of said threaded nuts, whereby each of said nut positioners is retainable in any desired position in one of said channels so that said threaded nut is retainable in the selected position in said channel.

3. A frame as defined in claim 2, wherein said nut positioner comprises a pair of spaced legs projecting therefrom and a foot transversely projecting outwardly from each said legs.

4. A frame comprising:
   a plurality of extrusions each having at least one longitudinally-extending channel defined by a bottom wall and two opposing side walls, each of said two opposing side walls having an inwardly-facing flange, the inwardly-facing flanges of the two opposing side walls positioned to face one another;
   a plurality of links each defining a plurality of apertures extending therethrough, each link of said plurality of links disposed against the flanges of an extrusion of said plurality of extrusions;
   a plurality of threaded nuts, the threaded nuts of said plurality of threaded nuts receivable in the longitudinally-extending channels of said plurality of extrusions; and
   a plurality of threaded bolts, the threaded bolts of said plurality of threaded bolts positioned to extend through the apertures extending through the links of said plurality of links and into the longitudinally-extending channels of the extrusions of said plurality of extrusions to engage with the threaded bolts of said plurality of threaded bolts, thereby to cause the links to firmly abut against the flanges.

* * * * *